United States Patent
Ramage et al.

(10) Patent No.: US 9,417,684 B2
(45) Date of Patent: Aug. 16, 2016

(54) MECHANISM FOR FACILITATING POWER AND PERFORMANCE MANAGEMENT OF NON-VOLATILE MEMORY IN COMPUTING DEVICES

(75) Inventors: Simon D. Ramage, Vancouver (CA); Jason A. Gayman, Folsom, CA (US); Joerg Hartung, Vancouver (CA); Curtis A. Gittens, Vancouver (CA); Sowmiya Jayachandran, Portland, OR (US); Richard P. Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 13/977,515

(22) PCT Filed: Dec. 22, 2011

(86) PCT No.: PCT/US2011/066948
§ 371 (c)(1),
(2), (4) Date: Jun. 28, 2013

(87) PCT Pub. No.: WO2013/095531
PCT Pub. Date: Jun. 27, 2013

(65) Prior Publication Data
US 2013/0275781 A1 Oct. 17, 2013

(51) Int. Cl.
*G06F 1/00* (2006.01)
*G06F 1/32* (2006.01)

(52) U.S. Cl.
CPC .......... *G06F 1/3275* (2013.01); *Y02B 60/1225* (2013.01); *Y02B 60/1228* (2013.01)

(58) Field of Classification Search
CPC .......... G06F 1/26; G06F 1/3275; G06F 12/00
See application file for complete search history.

(56) References Cited

U.S. PATENT DOCUMENTS 7,818,592 B2   10/2010   Meier et al.
7,971,062 B1   6/2011   Hughes et al.
(Continued)

OTHER PUBLICATIONS

PCT/US2011/066948 PCT Notification of Transmittal of International Search Report and the Written Opinion of the International Searching Authority, or the Declaration, Mailed Aug. 24, 2012, 9 pages.

*Primary Examiner* — Jaweed A Abbaszadeh
*Assistant Examiner* — Austin Hicks
(74) *Attorney, Agent, or Firm* — Blakely, Sokoloff, Taylor & Zafman LLP (57) ABSTRACT

A mechanism is described for facilitating power governance of non-volatile memory devices using a power governing mechanism employed at a computing device according to one embodiment of the invention. A method of embodiments of the invention includes maintaining a credit pool having a plurality of credits to be released to a plurality of memory channels associated with a plurality of non-volatile memory devices. The plurality of credits may be used to provide sufficient power to perform memory operations associated with a computing device. The method may further include receiving a credit request having a petition to obtain one or more credits for a memory channel of the plurality of memory channels to facilitate performance of a memory operation, determining whether the one or more credits are available in the credit pool, and retrieving the one or more credits from the credit pool, if the one or more credits are available in the credit pool. The method may further include releasing the one or more credits to the memory channel. The one or more released credits are used to perform the memory operation.

12 Claims, 4 Drawing Sheets

(56) References Cited

U.S. PATENT DOCUMENTS

2003/0217295 A1 11/2003 Sadowski
2008/0082751 A1* 4/2008 Okin et al. .................. 711/115
2008/0155271 A1 6/2008 Barck
2008/0263373 A1* 10/2008 Meier et al. .................. 713/300

* cited by examiner

MECHANISM FOR FACILITATING POWER AND PERFORMANCE MANAGEMENT OF NON-VOLATILE MEMORY IN COMPUTING DEVICES

CROSS-REFERENCE TO RELATED APPLICATION

This patent application is a U.S. National Phase Application under 35 U.S.C. §371 of International Application No. PCT/US2011/066948, filed Dec. 22, 2011, entitled MECHANISM FOR FACILITATING POWER AND PERFORMANCE MANAGEMENT OF NON-VOLATILE MEMORY IN COMPUTING DEVICES.

FIELD

The field relates generally to computing devices and, more particularly, to employing a mechanism for facilitating power and performance management of non-volatile memory in computing devices.

BACKGROUND

Conventional management techniques relating to concurrent throttling of memory channel tasks have inherent latencies that result in managing such tasks inefficiently and less accurately. For example, these conventional techniques are regarded inefficient at least due to the inherent overhead needed in responding to media operations and changing power constraints, leaving the power budget utilized suboptimally.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION

Embodiments of the invention provide a mechanism for facilitating power governance of non-volatile memory devices using a power governing mechanism employed at a computing device according to one embodiment of the invention. A method of embodiments of the invention includes maintaining a credit pool having a plurality of credits to be released to a plurality of memory channels associated with a plurality of non-volatile memory devices. The plurality of credits may be used to provide sufficient power to perform memory operations associated with a computing device. The method may further include receiving a credit request having a petition to obtain one or more credits for a memory channel of the plurality of memory channels to facilitate performance of a memory operation, determining whether the one or more credits are available in the credit pool, and retrieving the one or more credits from the credit pool, if the one or more credits are available in the credit pool. The method may further include releasing the one or more credits to the memory channel. The one or more released credits are used to perform the memory operation.

In one embodiment, a memory controller hardware-based method is provided for managing or governing power relating to non-volatile memory (NVM) (e.g., a Solid State Drive or Disk (SSD) that use NVM devices as main storage) by, for example, delaying the execution or limiting the number and types of concurrent NVM device operations in a storage solution. Embodiments of the invention are not limited to SSD and that other examples of NVM include a Phase Change Memory (PCM), a PCM and switch (PCMS), a Ferroelectric Random Access Memory (FeRAM) or a Ferroelectric Transistor RAM (FeTRAM) (such as made with ferroelectric polymer and silicon nanowires), a Magnetoresistive RAM (MRAM), a flash memory (e.g., a NAND flash), and the like. A hardware-managed power governor scheme allows for accurate governing of memory controller activities affecting NVM media power and provides rapid system response to changes in NVM power consumption and constraints. Further, this novel power governing technique reduces the need for and reliance on Central Processing Unit (CPU) resources for managing NVM operations dispatch, while improving the overall performance of a power-constrained NVM storage solution. The novel technique introduces, in one embodiment, a hardware-based management of NVM media power consumption that reduces CPU requirements for task dispatch while improving system responsiveness to changing power constraints. In other words, this hardware-based technique reduces the CPU firmware requirement and dependency, increases accuracy (e.g., eliminates certain software latencies), improves performance by providing a more efficient use of power balance, etc.

Figure 1:
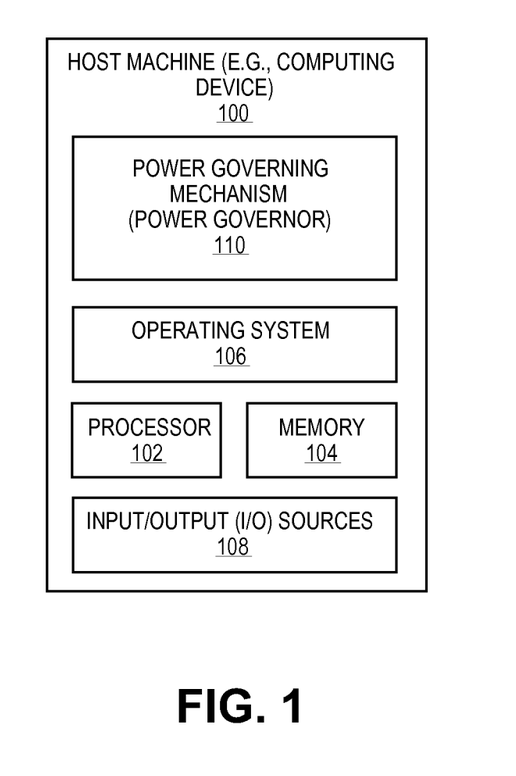
FIG. 1 illustrates a computing device employing a power governing mechanism according to one embodiment of the invention.

FIG. 1 illustrates a computing device employing a power governing mechanism according to one embodiment of the invention. In one embodiment, a host machine (e.g., computing device) 100 is illustrated as having a power governing mechanism ("power governor") 110 to facilitate dynamic, automatic, and efficient governing of power relating to non-volatile memory devices. Computing device 100 may include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebook, netbook, Ultrabook™, etc.), e-readers (e.g., Kindle®, Nook®, etc.), GPS-navigation systems, etc. Computing device 100 may further include set-top boxes (e.g., Internet-based cable television set-top boxes, etc.), and larger computing devices, such as desktop computers, server computers, cluster-based computers, etc.

Computing device 100 includes an operating system 106 serving as an interface between any hardware or physical resources of the computer device 100 and a user. Computing device 100 further includes one or more processors 102, memory devices 104, network devices, operating system drivers, or the like, as well as input/output (I/O) sources 108, such as touchscreens, touch panels, touch pads, virtual or regular keyboards, virtual or regular mice, etc. It is to be noted that terms like "computing device", "node", "computing node", "client", "memory client", "host", "server", "memory server", "machine", "device", "computing device", "computer", "computing system", "cluster based computer", and the like, are used interchangeably and synonymously throughout this document.

Figure 2:
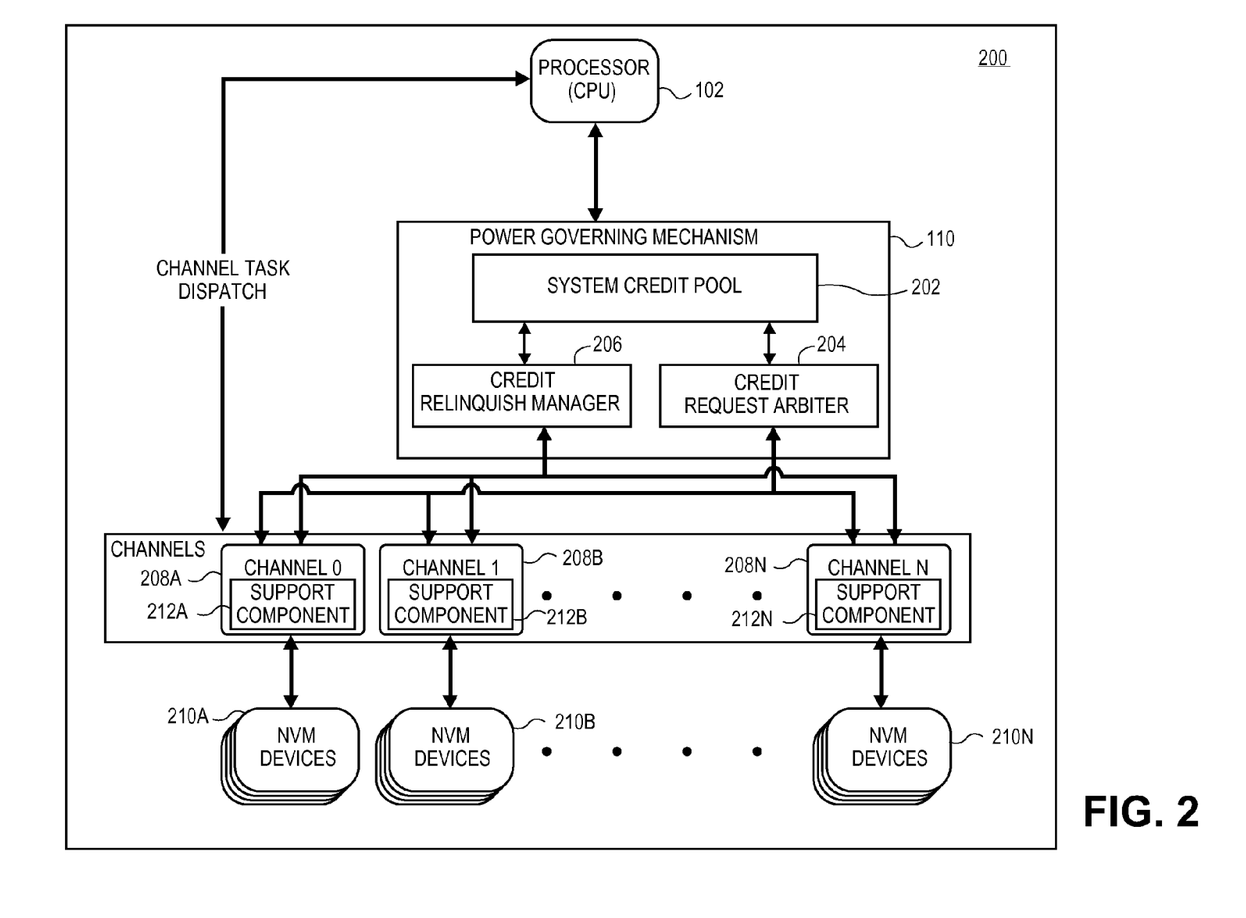
FIG. 2 illustrates a power governing mechanism according to one embodiment of the invention.

FIG. 2 illustrates a power governing mechanism according to one embodiment of the invention. In one embodiment, an SSD 200 includes a power governing mechanism 110 to facilitate a hardware-based management and governance of power for NVM devices. In the illustrated embodiment, the power governor 110 is shown to be in communication with a processor (CPU) 102 and further in communication with any number of memory channels 208A, 208B, 208N and their corresponding NVM devices 210A, 210B, 210N (e.g., SSD-based NVM device, etc.). Each memory channel 208A, 208B, 208N may include a support component 212A, 212B, 212N that is capable of maintaining communication with the power governor 110 and facilitate various transactions between one or more memory channels 208A, 208B, 208N and the power governor 110. In one embodiment, power governor 110 may be made part of a memory controller employed within the SSD 200. However, as aforementioned, SSD 200 is used here as an example for brevity, clarity and ease of understanding and further, embodiments of the invention are not limited to SSD 200 and that any number and type of other NVMs may employ and facilitate the power governor 110.

In one embodiment, the power governor 110 includes a system credit pool ("pool") 202, a credit request arbiter ("arbiter") 204, and a credit relinquish manager ("manager") 206. The processor 102 is responsible for dispatching various tasks to the memory channels 208A, 208B, 208N which then forward the tasks to any number of corresponding NVM devices 210A, 210B, 210N. Further, in one embodiment, a determined power budget or allocation for various memory operations is provided as a system credit pool 202 at the power governor 110. This system credit pool 202 may represent a total power budget for all memory operations or tasks that are to be facilitated and performed by the memory controller. The memory controller may work in cooperation with the memory channels 208A, 208B, 208N (which form a key portion of the memory controller's media interface logic) and their support components 212A, 212B, 212N to manage communication and data transfers between the NVM devices 210A, 210B, 210N and the memory controller. In one embodiment, the power governor 110 may be employed at and used by the memory controller to govern the NVM power budget and distribution by, for example, managing, including limiting, the number and types of concurrent NVM operations (e.g., NAND erase, NAND program, etc.) based on, for example, the known power consumption lows, averages, and/ or peaks associated with each NVM operation. The number of power credits (or power budget) of the credit pool 202 may be determined by the processor 102 and/or the memory controller (e.g., memory controller firmware) having the power governor 110. For example, the memory controller may specify the number of power credits required to perform each task dispatched by the processor 102 as necessitated by the requirements of the computing system (e.g., computing device 100 of FIG. 1) hosting the power governor 110.

In one embodiment, the illustrated power governor 110 is used to provide efficiency in limiting power consumption by NVM devices 210A, 210B, 210N in performance of their assigned NVM operations. As aforementioned, the power governor 110 may be part of a memory controller that is used to manage a global power credit system by having for the memory controller. The power governor 110 interacts with the memory channels 208A, 208B, 208N of the computing system to, for example, limit the number and types of concurrent NVM operations issued by these memory channels 208A, 208B, 208N. Throughout this document, terms like "operation", "NVM operation", "task", and "NVM task" are used synonymously and interchangeably.

In one embodiment, the arbiter 204 receives credits requests from one or more memory channels 208A, 208B, 208N, via their support components 212A, 212B, 212N, to facilitate NVM memory devices 210A, 210B, 210N, to perform memory operations. Each credit request (or simply "request") includes a petition to obtain a number of power credits, from the pool 202, required to perform a given task. The petition is meant for the pool 202 to release the requested number of power credits to a relevant memory channel, such as memory channel 208A, that corresponds to an NVM memory device.

In one embodiment, the arbiter 204 selects a credit request (from any number of received credit requests) and checks to see whether there are enough credits in the pool 202 that can be released so that a task associated with the selected credit request can be performed. If sufficient credits are found in the pool 202, the arbiter 204 releases the requested (or required) credits to the corresponding memory channel 208A, 208B, 208N so that the task associated with the selected request can be performed. If there are insufficient credits in the pool 202, the credit request is placed in a request queue and left to remain there by the arbiter 204 until sufficient credits become available in the pool 202. In one embodiment, sufficient credits may become available (or the number of total credits in the pool 202 may rise) when a number of unused credits are relinquished by one or more memory channels 208A, 208B, 208N upon completion of one or more tasks. Further, in one embodiment, while any number of requests remains pending in the request queue due to insufficient credits, the memory controller continues to facilitate performance and processing of other already-started tasks and have the memory channels 208A, 208B, 208N negotiate and relinquish any unused credits back to the pool 202.

In one embodiment, the manager 206 of the power governor 110 may be responsible for negotiating any relinquishing of unused credits with the memory channels 208A, 208B, 208N to avoid wasting any unused credits as well as their prompt addition to the pool 202. The queued and/or incoming requests may be preferred for selection or remain/wait in the queue for any number of reasons, such as system requirements, machine- or user-defined importance of tasks, tasks size, and the like. Embodiments of the invention are not limited to any particular type or size of tasks or their preference in processing. An arbitration scheme of the credit request arbiter 204 may be implementation-specific. Arbitration may cover priority when multiple support components 212A, 212B, 212N have simultaneous outstanding requests to the arbiter 204. An arbitration priority, for example, may be based on task type and/or the identification of the request/ support component 212A, 212B, 212N. Task credit requirements and system credit constraints or budgets may be configured by a memory controller firmware to regulate average and/or peak NVM power consumption and provide an improved responsiveness to changing power constraints.

It is contemplated that any number and type of components may be added to and removed from the power governing mechanism 110. For brevity, clarity, ease of understanding and to stay focused on the power governing mechanism 110, many of the standard or known components, such as those of a computing device, are not shown or discussed here. It is contemplated that embodiments of the invention are not limited to any particular technology or standard and is dynamic enough to adopt and adapt to the changing technologies and standards.

Figure 3:
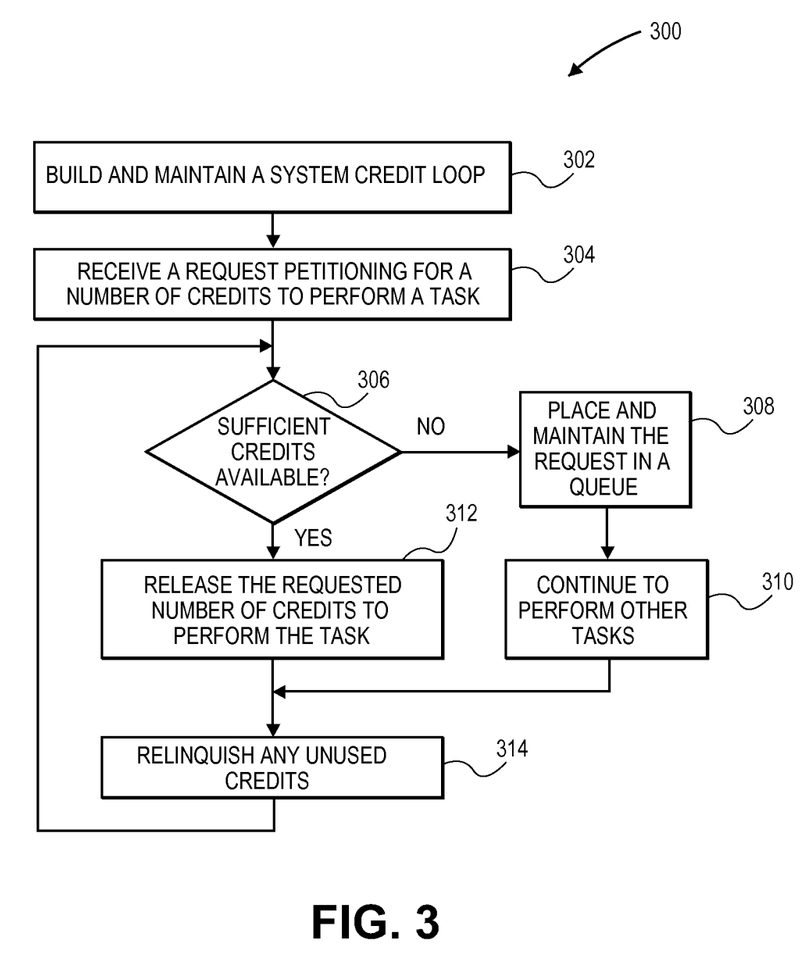
FIG. 3 illustrates a method for performing power governance of non-volatile memory devices according to one embodiment of the invention.

FIG. 3 illustrates a method for performing power governance of non-volatile memory devices according to one embodiment of the invention. Method 300 may be performed by processing logic that may comprise hardware (e.g., circuitry, dedicated logic, programmable logic, etc.), software (such as instructions run on a processing device), or a combination thereof. In one embodiment, method 300 may be performed by the power governing mechanism 110 of FIG. 1.

Method 300 starts at block 302 with building or generating of and maintaining a system credit pool at a power governor within a computing system. At block 304, a credit request is received at the power governor. This credit request may include a petition to obtain a number of credits from the pool so that a task can be performed. At block 306, a determination is made at the power governor as to whether there are sufficient credits available in the pool to be granted to a memory channel and onwards to the corresponding NVM devices. If yes, the available credits are released to the memory channel so that the task can be performed at block 312. If not, the received credit request is placed in a request queue and maintained there until sufficient credits become available at the pool at the block 308. At block 310, while the credit request remains in the queue, other NVM operations for which power credits have been granted can remain uninterrupted and continue to be processed.

At block 314, any unused credits from any number of completed tasks are relinquished by their respective memory channels to the power governor. These relinquished credits received at the power governor are placed back into the system credit pool to be used for any number of future NVM operations associated with credit requests on hold in the request queue or those that are yet to be received at the power governor.

Figure 4:
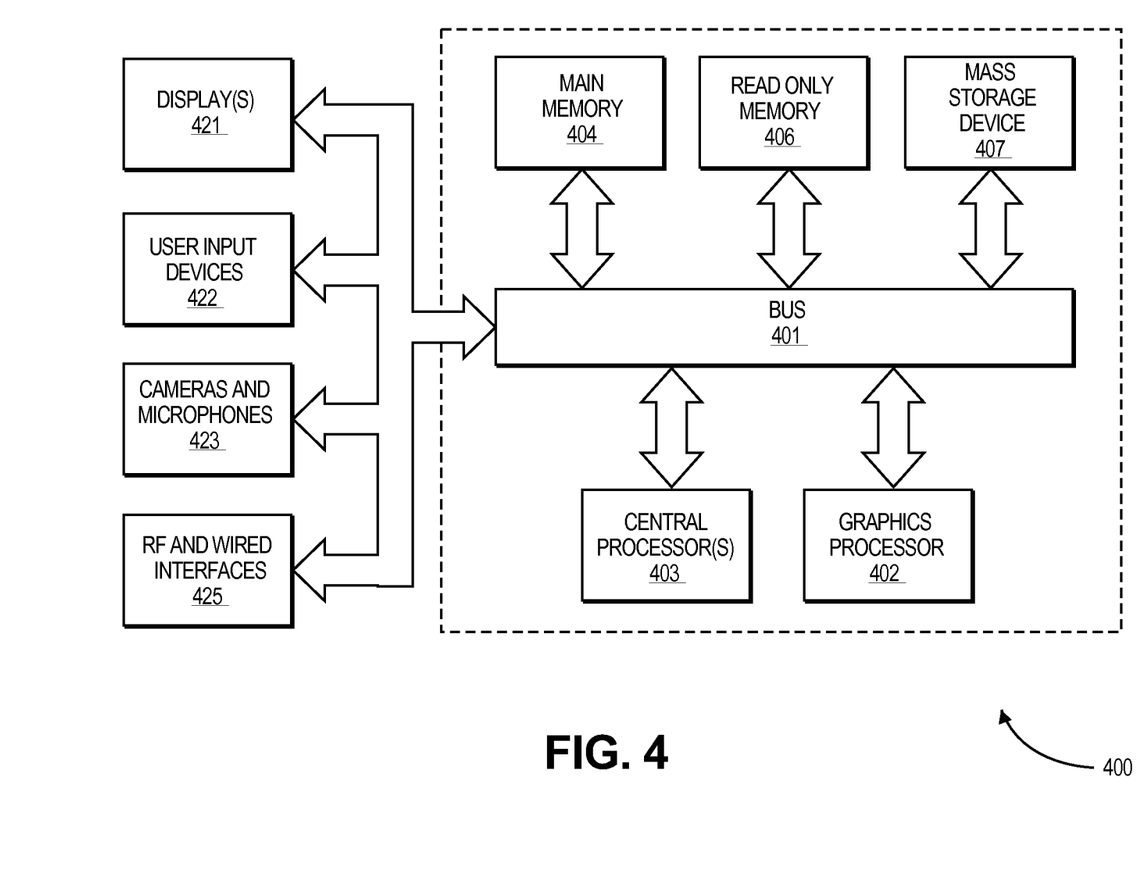
FIG. 4 illustrates a computing system according to one embodiment of the invention.

FIG. 4 illustrates a computing system 400 employing and facilitating a power governing mechanism 110 of FIG. 1 according to one embodiment of the invention. The exemplary computing system 400 may be the same as or similar to the computing device 100 FIG. 1. The computer system 400 includes a bus or other communication means 401 for communicating information, and processing means such as a microprocessor 403 coupled with the bus 401 for processing information. The computer system 400 may be augmented with a graphics processor 402 for rendering graphics through parallel pipelines and may be incorporated into one or more central processor(s) 403 or provided as one or more separate processors.

The computer system 400 further includes a main memory 404, such as a RAM or other dynamic data storage device, coupled to the bus 401 for storing information and instructions to be executed by the processor 403. The main memory also may be used for storing temporary variables or other intermediate information during execution of instructions by the processor. The computer system 400 may also include a nonvolatile memory 406, such as a Read-Only Memory (ROM) or other static data storage device coupled to the bus 401 for storing static information and instructions for the processor.

A mass memory 407 such as a magnetic disk, optical disc, or solid state array and its corresponding drive may also be coupled to the bus 401 of the computer system 400 for storing information and instructions. The computer system 400 can also be coupled via the bus to a display device or monitor 421, such as a Liquid Crystal Display (LCD) or Organic Light Emitting Diode (OLED) array, for displaying information to a user. For example, graphical and textual indications of installation status, operations status and other information may be presented to the user on the display device 421, in addition to the various views and user interactions discussed above.

Typically, user input devices 422, such as a keyboard with alphanumeric, function and other keys, etc., may be coupled to the bus 401 for communicating information and command selections to the processor 403. Additional user input devices 422 may include a cursor control input device such as a mouse, a trackball, a trackpad, or cursor direction keys can be coupled to the bus for communicating direction information and command selections to the processor 403 and to control cursor movement on the display 421.

Camera and microphone arrays 423 are coupled to the bus 401 to observe gestures, record audio and video and to receive visual and audio commands as mentioned above.

Communications interfaces 425 are also coupled to the bus 401. The communication interfaces may include a modem, a network interface card, or other well-known interface devices, such as those used for coupling to Ethernet, token ring, or other types of physical wired or wireless attachments for purposes of providing a communication link to support a LAN or Wide Area Network (WAN), for example. In this manner, the computer system 400 may also be coupled to a number of peripheral devices, other clients, or control surfaces or consoles, or servers via a conventional network infrastructure, including an Intranet or the Internet, for example. Examples of a network include, but are not limited to, a LAN, a WAN, a Metropolitan Area Network (MAN), a Personal Area Network (PAN), an intranet, the Internet, and the like.

It is to be appreciated that a lesser or more equipped system than the example described above may be preferred for certain implementations. Therefore, configuration of the computing system 400 may vary from implementation to implementation depending upon numerous factors, such as price constraints, performance requirements, technological improvements, or other circumstances.

Embodiments may be implemented as any or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware, such as firmware.

Embodiments may be provided, for example, as a computer program product which may include one or more machine-readable media, such as a non-transitory machine-readable medium, having stored thereon machine-executable instructions that, when executed by one or more machines such as a computer, such as computing system 400, network of computers, or other electronic devices, may result in the one or more machines carrying out operations in accordance with embodiments of the present invention. A machine-readable medium may include, but is not limited to, floppy diskettes, optical disks, Compact Disc-ROMs (CD-ROMs), and magneto-optical disks, ROMs, RAMs, Erasable Programmable Read-Only Memories (EPROMs), Electrically Erasable Programmable Read-Only Memories (EEPROMs), magnetic or optical cards, flash memory, or other type of media/machine-readable medium suitable for storing machine-executable instructions, such as solid state storage devices, fast and reliable DRAM sub-systems, etc.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

What is claimed is:

1. A method comprising:
maintaining a credit pool capable of having a plurality of credits to be released to a plurality of memory channels associated with a plurality of memory devices coupled to a computing device;
receiving a credit request having a petition to obtain one or more credits to perform a specific memory operation using a memory channel of the plurality of memory channels, wherein the specific memory operation comprises a memory controller activity for facilitating reduction in dependence on one or more components including a central processing unit;
determining whether the one or more credits are available in the credit pool, wherein determining includes deciding whether the specific memory operation is to be performed at the first memory channel,
wherein, if the one or more credits are available in the credit pool and the specific memory operation is allowed to be performed, the one or more credits are retrieved from the credit pool, and
wherein, if the one or more credits are not available in the credit pool and the specific memory operation is allowed to be performed, the credit request is placed in an arbitration queue to seek a secondary memory channel that is capable of relinquishing the one or more credits based on an arbitration scheme, wherein the one or more credits are acquired from the second memory channel in response to negotiations with the second memory channel based on the arbitration scheme; and
releasing the one or more credits to the first memory channel, wherein the one or more credits are retrieved from the credit pool or acquired from the second memory channel.

2. The method of claim 1, wherein the one or more credits relinquished by the second memory operation comprise unused credits.

3. The method of claim 2, wherein, if the one or more credits are available or not available in the credit pool and the specific memory operation is not allowed to be performed, the credit request for the one or more credits to perform the specific memory operation is denied, wherein the credit request is placed in a request queue.

4. The method of claim 1, wherein the computing device comprises one or more of a mobile computing device, a smartphone, a personal digital assistant (PDA), a handheld computer, an e-reader, a tablet computer, a notebook, a netbook, an ultrabook, a desktop computer, a server computer, a cluster-based computer, and a set-top box.

5. A system comprising:
a computing device having a memory to store instructions, and a processing device to execute the instructions, wherein the instructions cause the processing device to:
maintain a credit pool capable of having a plurality of credits to be released to a plurality of memory channels associated with a plurality of non-volatile memory devices coupled to the computing device;
receive a credit request having a petition to obtain one or more credits to perform a specific memory operation using a memory channel of the plurality of memory channels, wherein the specific memory operation comprises a memory controller activity for facilitating reduction in dependence on one or more components including a central processing unit;

determine whether the one or more credits are available in the credit pool, wherein determining includes deciding whether the specific memory operation is to be performed at the first memory channel, wherein, if the one or more credits are available in the credit pool and the specific memory operation is allowed to be performed, the one or more credits are retrieved from the credit pool, and wherein, if the one or more credits are not available in the credit pool and the specific memory operation is allowed to be performed, the credit request is placed in an arbitration queue to seek a secondary memory channel that is capable of relinquishing the one or more credits based on an arbitration scheme, wherein the one or more credits are acquired from the second memory channel in response to negotiations with the second memory channel based on the arbitration scheme; and release the one or more credits to the first memory channel, wherein the one or more credits are retrieved from the credit pool or acquired from the second memory channel.

6. The system of claim 5, wherein the one or more credits relinquished by the second memory operation comprise unused credits.

7. The system of claim 6, wherein, if the one or more credits are available or not available in the credit pool and the specific memory operation is not allowed to be performed, the credit request for the one or more credits to perform the specific memory operation is denied, wherein the credit request is placed in a request queue.

8. The system of claim 5, wherein the computing device comprises one or more of a mobile computing device, a smartphone, a personal digital assistant (PDA), a handheld computer, an e-reader, a tablet computer, a notebook, a netbook, an ultrabook, a desktop computer, a server computer, a cluster-based computer, and a set-top box.

9. At least one non-transitory machine-readable medium having instructions stored thereon which, if executed by a computing device, cause the computing device to:

maintain a credit pool capable of having a plurality of credits to be released to a plurality of memory channels associated with a plurality of non-volatile memory devices coupled to the computing device;

receive a credit request having a petition to obtain one or more credits to perform a specific memory operation using a memory channel of the plurality of memory channels, wherein the specific memory operation comprises a memory controller activity for facilitating reduction in dependence on one or more components including a central processing unit;

determine whether the one or more credits are available in the credit pool, wherein determining includes deciding whether the specific memory operation is to be performed at the first memory channel, wherein, if the one or more credits are available in the credit pool and the specific memory operation is allowed to be performed, the one or more credits are retrieved from the credit pool, and wherein, if the one or more credits are not available in the credit pool and the specific memory operation is allowed to be performed, the credit request is placed in an arbitration queue to seek a secondary memory channel that is capable of relinquishing the one or more credits based on an arbitration scheme, wherein the one or more credits are acquired from the second memory channel in response to negotiations with the second memory channel based on the arbitration scheme; and release the one or more credits to the first memory channel, wherein the one or more credits are retrieved from the credit pool or acquired from the second memory channel.

10. The computer-readable media of claim 9, wherein one or more credits relinquished by the second memory channel comprise unused credits.

11. The computer-readable media of claim 10, wherein, if the one or more credits are available or not available in the credit pool and the specific memory operation is not allowed to be performed, the credit request for the one or more credits to perform the specific memory operation is denied, wherein the credit request is placed in a request queue.

12. The computer-readable media of claim 9, wherein the computing device comprises one or more of a mobile computing device, a smartphone, a personal digital assistant (PDA), a handheld computer, an e-reader, a tablet computer, a notebook, a netbook, an ultrabook, a desktop computer, a server computer, a cluster-based computer, and a set-top box.

* * * * *